(12) United States Patent
Angelosante

(10) Patent No.: US 11,682,890 B2
(45) Date of Patent: Jun. 20, 2023

(54) ELECTRONIC PROTECTION DEVICE FOR ELECTRIC POWER DISTRIBUTION GRIDS

(71) Applicant: ABB Schweiz AG, Baden (CH)

(72) Inventor: Daniele Angelosante, Turgi (CH)

(73) Assignee: ABB Schweiz AG, Baden (CH)

(*) Notice: Subject to any disclaimer, the term of this patent is extended or adjusted under 35 U.S.C. 154(b) by 417 days.

(21) Appl. No.: 16/984,257

(22) Filed: Aug. 4, 2020

(65) Prior Publication Data
US 2021/0044100 A1 Feb. 11, 2021

(30) Foreign Application Priority Data

Aug. 5, 2019 (EP) .................................... 19189943

(51) Int. Cl.
| | |
|---|---|
| *H02H 3/00* | (2006.01) |
| *H02H 3/08* | (2006.01) |
| *H02J 3/00* | (2006.01) |
| *H02H 7/26* | (2006.01) |

(52) U.S. Cl.
CPC .............. *H02H 3/08* (2013.01); *H02H 7/261* (2013.01); *H02J 3/001* (2020.01)

(58) Field of Classification Search
CPC ............ H02H 3/08; H02H 7/261; H02J 3/001
USPC .......................................................... 361/63
See application file for complete search history.

(56) References Cited

U.S. PATENT DOCUMENTS

| | | | | |
|---|---|---|---|---|
| 2008/0097706 A1* | 4/2008 | McCormack | .......... | H02H 7/261 |
| | | | | 702/59 |
| 2012/0001580 A1* | 1/2012 | Zhang | .................. | G01R 31/343 |
| | | | | 318/490 |

FOREIGN PATENT DOCUMENTS

| | | |
|---|---|---|
| CN | 107294049 A | 10/2017 |
| CN | 108229733 A | 6/2018 |
| CN | 108957304 A | 12/2018 |
| EP | 2720332 A2 | 4/2014 |
| EP | 3396802 A1 | 10/2018 |

OTHER PUBLICATIONS

European Patent Office, Search Report issued in corresponding Application No. 19189943.4, dated Feb. 7, 2020, 4 pp.

* cited by examiner

*Primary Examiner* — Jared Fureman
*Assistant Examiner* — Lucy M Thomas
(74) *Attorney, Agent, or Firm* — Leydig, Voit & Mayer, Ltd.

(57) ABSTRACT

An electronic protection device for electric power distribution grids, the electronic protection device being adapted to control one or more switching devices in an electric power distribution grid and being capable of communicating, at local level, with one or more sensors or electronic devices of the electric power distribution grid and, at remote level, with a remote computerised platform. The electronic protection device is adapted to receive first grid monitoring data indicative of physical quantities related to the operation of the electric power distribution grid from the sensors or electronic devices, the first grid monitoring data including at least measured values indicative of a line current flowing along an electric line of the electric power distribution grid. The electronic protection device is adapted to carry out a predictive monitoring procedure of the operating conditions of the electric power distribution grid.

20 Claims, 4 Drawing Sheets

ELECTRONIC PROTECTION DEVICE FOR ELECTRIC POWER DISTRIBUTION GRIDS

The present invention relates to the field of electric power distribution grids.

More particularly, the present invention relates to an electronic protection device capable of providing improved monitoring performances of the operation of a low voltage or medium voltage electric power distribution grid.

For the purposes of the present application, the term "low voltage" (LV) relates to operating voltages lower than 1 kV AC and 1.5 kV DC whereas the term "medium voltage" (MV) relates to operating voltages higher than 1 kV up to some tens of kV, e.g. 70 kV AC and 100 kV DC. As is known, an electric power distribution grid comprises suitable switching devices (e.g. circuit breakers, disconnectors, contactors, and the like) designed to enable specific grid sections to properly operate.

Typically, these switching devices are operatively associated with electronic protection devices (also known as "electronic protection relays"). These latter are adapted to check operating conditions of an electric line, determine whether failure events or dangerous overload events are present and generate suitable trip commands to prompt the intervention of the associated switching devices in case of need.

The experience has shown that currently available electronic protection devices may often cause undesired interventions of the associated switching devices, particularly when they detect overload phenomena.

In general, this is basically due to the fact that electronic protection devices adopt checking criteria based on predefined reference tripping curves to determine whether overload conditions are really dangerous to operation of the electric power distribution grid.

Obviously, the above-mentioned undesired interventions of the switching devices complicate the operating management of the electric power distribution grid and they may lead to unnecessary operation outages.

In accordance to the most recent developments related to smart grid technologies, it is quite felt the need for solutions capable of ensuring improved monitoring performances of the operation of an electric power distribution grid, thereby allowing an easier management of this latter, particularly when overload events occur.

In order to respond to this need, the present invention provides an electronic protection device for electric power distribution grids, according to the following claim 1 and the related dependent claims.

In general, the electronic protection device of the invention is adapted to control one or more switching devices in an electric power distribution grid and it is capable of communicating, at local level, with one or more sensors or electronic devices of said electric power distribution grid and, at remote level, with a remote computerised platform.

In operation, the electronic protection device of the invention is adapted to receive first grid monitoring data indicative of physical quantities related to the operation of the electric power distribution grid from the above-mentioned sensors or electronic devices.

Said first grid monitoring data include at least measured values indicative of at least a line current flowing along at least an electric line of said electric power distribution grid.

An important aspect of the invention consists in that it is adapted to carry out a predictive monitoring procedure of the operating conditions of said electric power distribution grid.

According to the invention, said predictive monitoring procedure including the following steps:

basing at least on the above-mentioned first grid monitoring data, calculating grid data sets indicative of the behaviour of said electric power distribution grid in a first time interval preceding a reference instant. Each data set includes at least a measured value indicative of said line current and monitored at a corresponding instant of said first time interval;

basing on the calculated grid data sets, calculating a joint probability distribution function indicative of the behaviour said line current in a second time interval following said reference instant. Said joint probability distribution function is calculated basing on a predictive calculation model or function;

basing on said joint probability distribution function, calculating a probability value indicative of the probability that said line current causes a trip intervention of said electronic protection device in said second time interval, according to a given reference tripping curve adopted by said electronic protection device;

comparing the calculated probability value with a predefined probability threshold value.

Preferably, the electronic protection device of the invention generates an alarm signal, if said probability value exceeds said predefined probability threshold value. In this way, the operator can be informed that there is an impelling risk of a trip intervention by the electronic protection relay.

Preferably, the electronic protection device of the invention transmits said alarm signal to said computerised platform or to another electronic device in communication with said electronic protection device.

Preferably, the electronic protection device of the invention transmits above-mentioned first monitoring data to said computerised platform.

Preferably, the electronic protection device of the invention receives second grid monitoring data indicative of environmental conditions at said electric power distribution grid from said computerised platform.

Preferably, the electronic protection device of the invention calculates the above-mentioned grid data sets basing on both the above-mentioned first and second grid monitoring data.

Preferably, the electronic protection device of the invention receives above-mentioned predictive calculation model from said computerised platform during an update firmware session of said electronic protection device.

According to alternative embodiments of the invention, however, the electronic protection device of the invention may be configured to set the predictive calculation model F by itself basing at least on said first grid monitoring data GD1 and, possibly, on other data received through the Internet and from Building Management Systems.

In a further aspect, the present invention relates to a computerised system for monitoring operation of an electric power distribution grid, according to the following claim 8 and the related dependent claims.

The computerised system, according to the invention, comprises at least an electronic protection device, according to the invention, and a computerised platform in communication with said at least an electronic protection device.

Preferably, the computerised platform of the computerised system, according to the invention, sets and transmits said predictive calculation model to said at least an electronic protection device in order to allow this latter to carry out said predictive monitoring procedure.

Preferably, the computerised platform of the computerised system, according to the invention, sets said predictive calculation model basing on said first grid monitoring data received from said electronic protection device.

Preferably, the computerised platform of the computerised system, according to the invention, sets above-mentioned predictive calculation model basing also on profiling models describing the characteristics of said electric power distribution grid.

Preferably, the computerised platform of the computerised system, according to the invention, transmits above-mentioned second grid monitoring data to said at least an electronic protection device.

Preferably, the computerised platform of the computerised system, according to the invention, receives above-mentioned second grid monitoring data from external computerised platforms in communication with said computerised platform.

Further characteristics and advantages of the present invention will emerge more clearly from the description of preferred, but not exclusive embodiments of the computerised platform, according to the invention, of which non-limiting examples are shown in the attached drawings, wherein.

With reference to the above-mentioned figures, the present invention refers to an electronic protection device 1 (or electronic protection relay) suitable for installation of a low voltage or medium voltage electric power distribution grid.

In general, such an electric power distribution grid may be of any type used for LV or MV applications, according to the needs.

In addition to the electronic protection device 1, such an electric power distribution grid comprises one or more switching devices (e.g. circuit breakers, disconnectors, contactors, or the like), one or more sensors (e.g. voltage sensors, current sensors, temperature sensors, and the like) or electronic devices (e.g. further electronic protection devices or other control device). When installed in the electric power distribution grid, the electronic protection device 1 is operatively associated to one or more switching devices 20 to control operation of these latter. The electronic protection device 1 and the associated switching devices 20 may be conveniently included in a same switchgear, in accordance to installation arrangements of known type.

Figure 4:
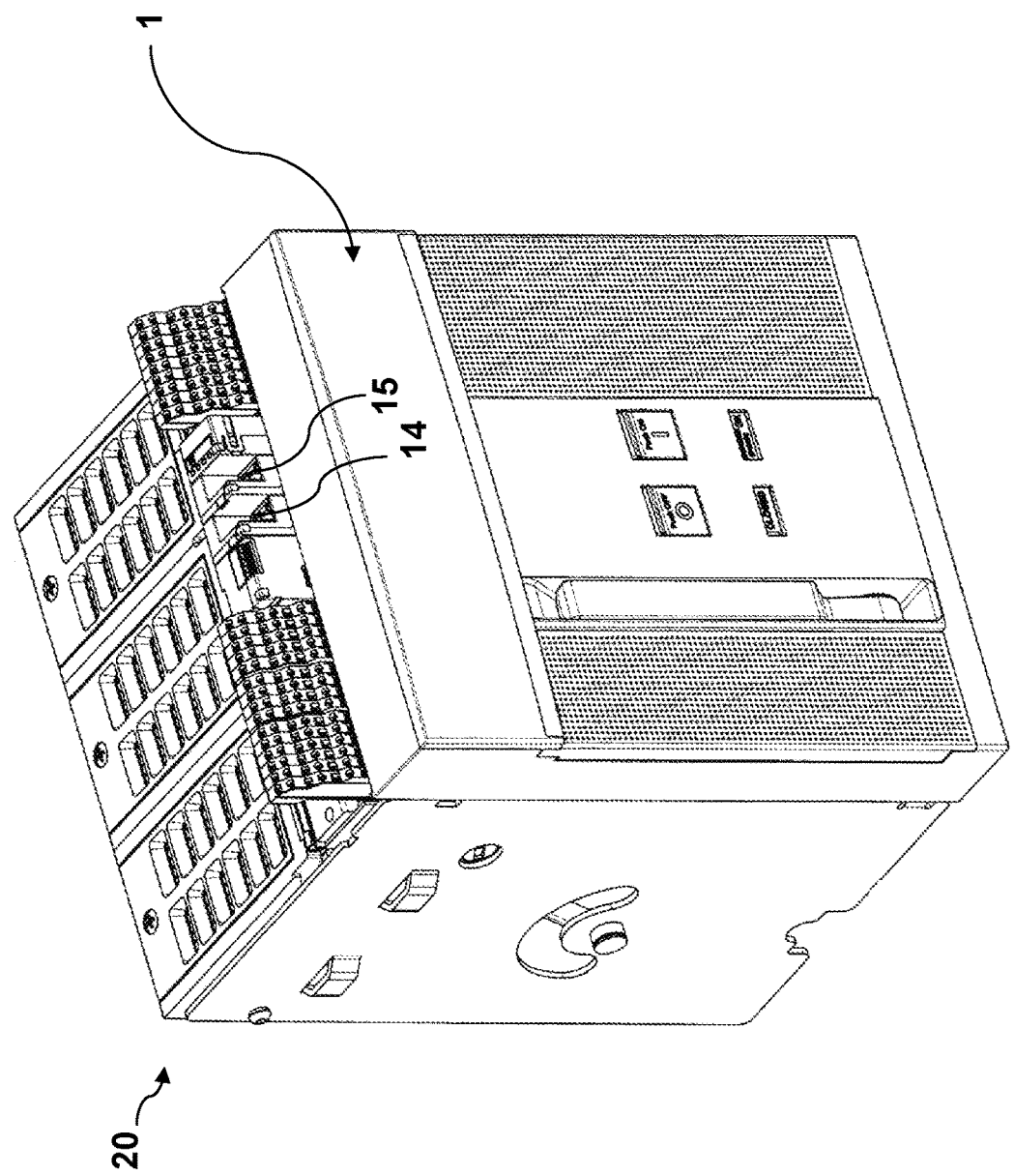
FIG. 4 is a schematic view showing the electronic protection, according to the invention, mounted on a circuit breaker.

According to preferred embodiments of the invention, the electronic protection device 1 is incorporated in a switching device 20 as shown in FIG. 4.

As an alternative, the electronic protection device 1 may be a stand-alone device or integrated in another electronic device.

In general, the electronic protection device 1 is configured to monitor the operating conditions of an electric line of the electric power distribution grid, check such operating conditions and provide suitable commands TC (trip intervention) in order to prompt the intervention of the associated switching device 20 in the event of anomalous conditions, e.g. fault conditions, short-circuit conditions or overload conditions.

The presence anomalous conditions (e.g. overload conditions) and the consequent trip intervention (i.e. the provision of suitable commands TC to prompt the intervention of the associated switching device 20) are conveniently determined by the electronic protection device basing on a given reference tripping curve adopted (stored in a memory) by said electronic protection device.

For the sake of clarity, it is specified that the term "overload conditions" refers to operating conditions, in which the current flowing along an electric line is marginally larger than the nominal current (i.e. it takes values about 1-1.5 times higher than the nominal current value) for at least a certain time interval set by said reference tripping curve.

In order to carry out its functionalities, the electronic protection device 1 comprises a control unit 13 conveniently including suitable data processing resources (e.g. one or more microprocessors) that are preferably of digital type, i.e. adapted to execute suitable software instructions stored in a memory.

The electronic protection device 1 is capable of communicating at local level (i.e. with devices arranged at level of the electric power distribution grid) with one or more sensors or electronic devices 70 of the electric power distribution grid.

To this aim, the electronic protection device 1 may be conveniently equipped with one or more accessory devices 14 (which may be of known type) operatively coupled with the control unit 13 to potentiate/expand local communication functionalities of this latter e.g. by providing suitable interfaces towards local communication buses.

Communication with sensors and electronic devices 70 may also occur at switchgear level through so-called "switchgear buses", for example using communication protocols of the FIELDBUS type (such as CAN or ETHERNET) and adopting communication modes of the "multi-master" type.

Communication with sensors and electronic devices 70 may occur at grid level through so-called "system buses" of the electric power distribution grid, for example using communication protocols of the MODBUS, PROFIBUS, PROFINET or MODBUS-TCP type and communication modes of the "master-slave" type.

The electronic protection device 1 may be further equipped to communicate at local level with an operator (e.g. through a HMI or an interactive screen 19) and/or through a suitable communication port 18 of the wired or wireless type (e.g. a USB port).

The electronic protection device 1 is capable of communicating at remote level, i.e. to communicate with computerised devices arranged far away from the electric power distribution grid.

As an example, the electronic protection device 1 may be configured to communicate with the computer or a smartphone of an operator to send e-mails or SMS messages to the operator.

In order to communicate a at remote level, the electronic protection device 1 may be conveniently equipped with one or more accessory devices 14 (which may be of known type) operatively coupled with the control unit 13 to potentiate/expand remote communication functionalities of this latter, for example by providing gateway functionalities to access the Internet by means of a suitable communication wired lines (e.g. of the CAN or ETHERNET type) or suitable antenna arrangements (e.g. of the Wi-Fi or Bluetooth type).

According to the invention, the electronic protection device 1 is capable of communicating with a remote computerised platform 50.

Preferably, communication between the electronic protection device 1 and the computerised platform 50 occurs through the Internet.

The remote computerised platform 50 may consist of a single computerized unit or several computerized units, e.g. connectable through the Internet and interacting one with another to implement a cloud computing architecture.

As an example, the remote computerised platform 50 may include one or more computer units provided with an operating system for devices with "server" type functionalities, for example Windows Server™, Windows Azure™, Mac OS Server™ or the like.

According to further embodiments (not shown), the remote computerised platform 50 may be a computerised platform adapted to carry out Building Management System functionalities.

According to the invention, the electronic protection device 1 is adapted to receive first grid monitoring data GD1 indicative of physical quantities related to the operation of the electric power distribution grid.

In operation, the electronic protection device 1 receives the first grid monitoring data GD1 from the sensors and electronic devices 70 of the electric power distribution grid, which are in communication with it.

First grid monitoring data GD1 may include measured values related to physical quantities of different type, such as measured values of currents, voltages, temperatures and the like.

According to the invention, first grid monitoring data GD1 include at least first measured values $IL_k$ indicative of at least a line current IL flowing along at least an electric line 500 of the electric power distribution grid.

Conveniently, each generic first measured value $IL_k$ is a current value (e.g. a RMS current value) measured at a corresponding sampling instant $t_k$ by a suitable current measuring sensor (which may be of known type) in communication with the electronic protection device 1.

Preferably, the electronic protection device 1 is adapted to transmit the first monitoring data GD1 to the computerised platform 50. Data transmission may be carried out by the electronic protection device 1 in a known manner on a run-time basis or, more preferably, on a periodic basis.

An essential aspect of the invention consists in that the electronic protection device 1 is adapted to carry out a monitoring procedure 100, which allows predicting the behaviour of the line current IL flowing along the electric line 500 for a certain prediction time horizon T2 following a given reference instant $t_0$ (typically reflecting the current time instant) basing at least on grid monitoring data GD1 and possibly other data collected for a certain historical time horizon T1 preceding the reference instant $t_0$.

The monitoring procedure 100 allows predicting the behaviour of the line current IL within a time horizon T2 having a high level of granularity (e.g. at subsequent instants $t_j$ separated by time intervals of 1 s) to predict whether the electric line 500 is subject to overload conditions within the prediction time horizon T2.

Differently from other predictive load monitoring methods of the state of the art, the prediction time horizon T2 can be selected to take into consideration possible short-term overload conditions (e.g. when the line current has high values) or possible long-term overload conditions (e.g. when the line current has values slightly higher than the nominal values) or both. As an example, the time horizon T2 can be of some minutes or some hours, according to the needs.

Preferably, the electronic protection device 1 executes cyclically the predictive monitoring procedure 100. At each execution cycle, the monitoring results provided by the predictive monitoring procedure 100 may be conveniently used to trigger the execution of the most appropriate counter actions to prevent or mitigate the above-mentioned predicted overload conditions.

According to the invention, the procedure 100 comprises the step 101 of calculating a time series of grid data sets DS indicative of the behaviour of the electric power distribution grid at sampling instants included in a first time interval T1 (historical time horizon) preceding a reference instant $t_0$.

The reference instant $t_0$ is may be set conventionally according to the needs.

Preferably, the reference instant $t_0$ is the current operation instant (or the current sampling instant) of the electronic protection device 1.

The calculation of the grid data sets DS is conveniently carried out basing at least on the first grid monitoring data GD1 received from the sensors and electronic devices 70 in communication with the electronic protection device 1.

According to preferred embodiments of the invention, the electronic protection device 1 is adapted to receive second grid monitoring data GD2 indicative of environmental conditions (e.g. precipitation level, atmospheric humidity, atmospheric temperature, atmospheric pressure, building occupancy, data available on the Internet or social networks, and the like) at the electric power distribution grid from the computerised platform 50.

In this case, the calculation of the grid data sets DS is conveniently carried out basing on both the first and second grid monitoring data GD1, GD2.

Preferably, the computerised platform 50 is adapted to transmit the second grid monitoring data GD2 to the electronic protection device 1, for example on a periodic time basis.

Preferably, the computerised platform 50 is adapted to receive the second grid monitoring data GD2 from external computerised platforms 90 (e.g. publically available information sources), which can preferably communicate with the computerised platform 50 via the Internet.

Preferably, the first time interval T1 preceding the reference instant to has a relatively long extension, for example 24 h or even some days.

As mentioned above, each data set $DS_k$ is referred to a corresponding sampling instant $t_k$ included in the first time interval T1.

Preferably, subsequent sampling instants $t_k$ are separated by a relatively short sampling period, for example 1 s.

Conveniently, each data set $DS_k$ comprises in general a number of data records including measured values related to physical quantities of the power distribution grid, measured values related to environmental conditions at the power distribution grid, timing information to identify the data set, and the like.

According to the invention, each data set $DS_k$ includes at least a measured value $IL_k$ indicative of the above-mentioned line current IL and monitored at a corresponding instant $t_k$ of the first time interval T1.

As an example, each data set $DS_k$ may include the following data records (FIG. 2):

a first data record $TAG1_k$ including a corresponding measured value $IL_k$ indicative of the above-mentioned line current IL flowing along the electric line 500;

a second data record $TAG2_k$ including a corresponding measured value $T_k$ indicative of the atmospheric temperature at said electric power distribution grid;

a third data record $TAG3_k$ including a corresponding measured value $RN_k$ indicative of the precipitation level at said electric power distribution grid;

a fourth data record $TAG4_k$ including a corresponding measured value $H_k$ indicative of the atmospheric humidity level at said electric power distribution grid;

a fifth data record $TAG5_k$ including a corresponding measured value $B_k$ indicative of the atmospheric pressure level at said electric power distribution grid;

a sixth data record $TAG6_k$ including the daytime of the corresponding sampling instant $t_k$;

a seventh data record $TAG7_k$ including the day in week of the corresponding sampling instant $t_k$;

an eighth data record $TAG8_k$ including the week in year of the corresponding sampling instant $t_k$.

According to the invention, the procedure 100 comprises the step 102 of calculating, basing on the above-mentioned data sets DS, a joint probability distribution function PDF indicative of the behaviour of the above-mentioned line current IL in a second time interval T2 (prediction time horizon) following the reference instant $t_0$.

According to the invention, the calculation of the joint probability distribution function PDF is carried out basing on a predictive calculation model or function F.

Preferably, the second time interval T2 following the reference instant to has a relatively short extension, e.g. from some minutes to few hours).

The above-mentioned joint probability distribution function PDF is conveniently calculated at corresponding sampling instants $t_j$ included in the second time interval T2.

Preferably, subsequent sampling instants $t_j$ are separated by a relatively short sampling period, for example 1 s.

The step 102 of the procedure 100 basically consists of a regression processing of the time series of data sets DS calculated at the preceding step 101 of the procedure 100.

Such a regression processing is conveniently carried out by means of a predictive calculation model or function F suitable for neural-network-based regression techniques or other regression techniques of known type, e.g. a Gaussian process based techniques, random forest based techniques, and the like.

Preferably, the above-mentioned predictive calculation model or function F is learnt at least from available historical data GD1 related to the behaviour of the electric power distribution grid, in particular related to the behaviour of the line current IL.

According to preferred embodiments of the invention, the predictive calculation model or function F is set by the computerised platform 50, preferably basing on the first grid monitoring data GD1.

Preferably, the computerised platform 50 is adapted to set the above-mentioned predictive calculation model or function F by processing the first grid monitoring data GD1 received from the electronic protection device 1.

Preferably, the computerised platform 50 is adapted to set the above-mentioned predictive calculation model or function F according to suitable model training techniques of known type, which are preferably carried out during training sessions that are executed independently from the predictive monitoring procedure 100.

Preferably, basing on the first monitoring grid GD1 that are progressively transmitted by the electronic protection device 1, the computerised platform 50 updates the above-mentioned predictive calculation model or function F and periodically transmits a new updated version of said predictive calculation model to the electronic protection device 1, for example, during an update firmware session of this latter.

The solution of leaving the task of training the above-mentioned predictive calculation model to the computerised platform 50 is particularly advantageous as it prevents the electronic protection device 1 from dealing with an excessive computational load that would need powerful computational resources.

Preferably, the computerised platform 50 is adapted to set the above-mentioned predictive calculation model or function F by processing suitable profiling models describing the characteristics of said electric power distribution grid. Such a profiling model may be obtained by suitably modelling the behaviour of the electric power distribution grid through simulation techniques or profiling techniques of known type.

Preferably, the computerised platform 50 is adapted to set the above-mentioned predictive calculation model or function F in accordance with suitable load aggregation modelling techniques (which may be of known type), in such a way that such is predictive calculation model usable also by other electronic protection devices of the electric power distribution grid.

According to alternative embodiments of the invention, the predictive calculation model or function F is set by the electronic protection device 1 itself, for example basing at least on the available historical data GD1 and, possibly, on other data received through the Internet, for example from the computerised platform.

According to the invention, the procedure 100 comprises the step 103 of calculating, basing on the above-mentioned joint probability distribution function PDF, a probability value $P_{OL}$ indicative of the probability that the line current IL circulating along the electric line 500 causes a trip intervention of the electronic protection relay in the second time interval T2, according to a reference tripping curve used by the electronic protection device.

The calculation of the probability value POL can be carried out according to mathematical techniques of known type, for example by integrating the joint probability distribution function calculated for the time interval T2 in accordance with the current profile dictated by the above-mentioned reference tripping curve.

According to the invention, the predictive monitoring procedure 100 comprises the step 104 of comparing the calculated probability value $P_{OL}$ with a predefined probability threshold value $P_{TH}$.

Preferably, if the calculated probability value $P_{OL}$ is lower or equal to the probability threshold value $P_{TH}$, steps 102-104 of the predictive monitoring procedure 100 may be cyclically repeated by selecting a new reference instant $t_{0new}$, which may the sampling instant just subsequent to the reference instant to (in this case $t_{0new}=t_0+1$) or another reference instant following the reference instant $t_0$.

Preferably, if the calculated probability value $P_{OL}$ is higher than the probability threshold value $P_{TH}$, steps 102-104, the electronic protection device 1 generates an alarm signal A.

Preferably, the electronic protection device 1 is adapted to transmit the generated alarm signal A to the computerised platform 100 or to another electronic device in communication with said electronic protection device (e.g. the HMI of a switching device).

In this way (if possible), the plant operator, the computerised platform 50 or another control device intended to control the functionalities of the electric power distribution grid can take appropriate counter-actions (e.g. by implementing suitable load shedding strategies) to suitably control the line current IL and possibly avoid undesired interventions of switching devices intended to interrupt the line current IL.

EXAMPLE

Figure 1:
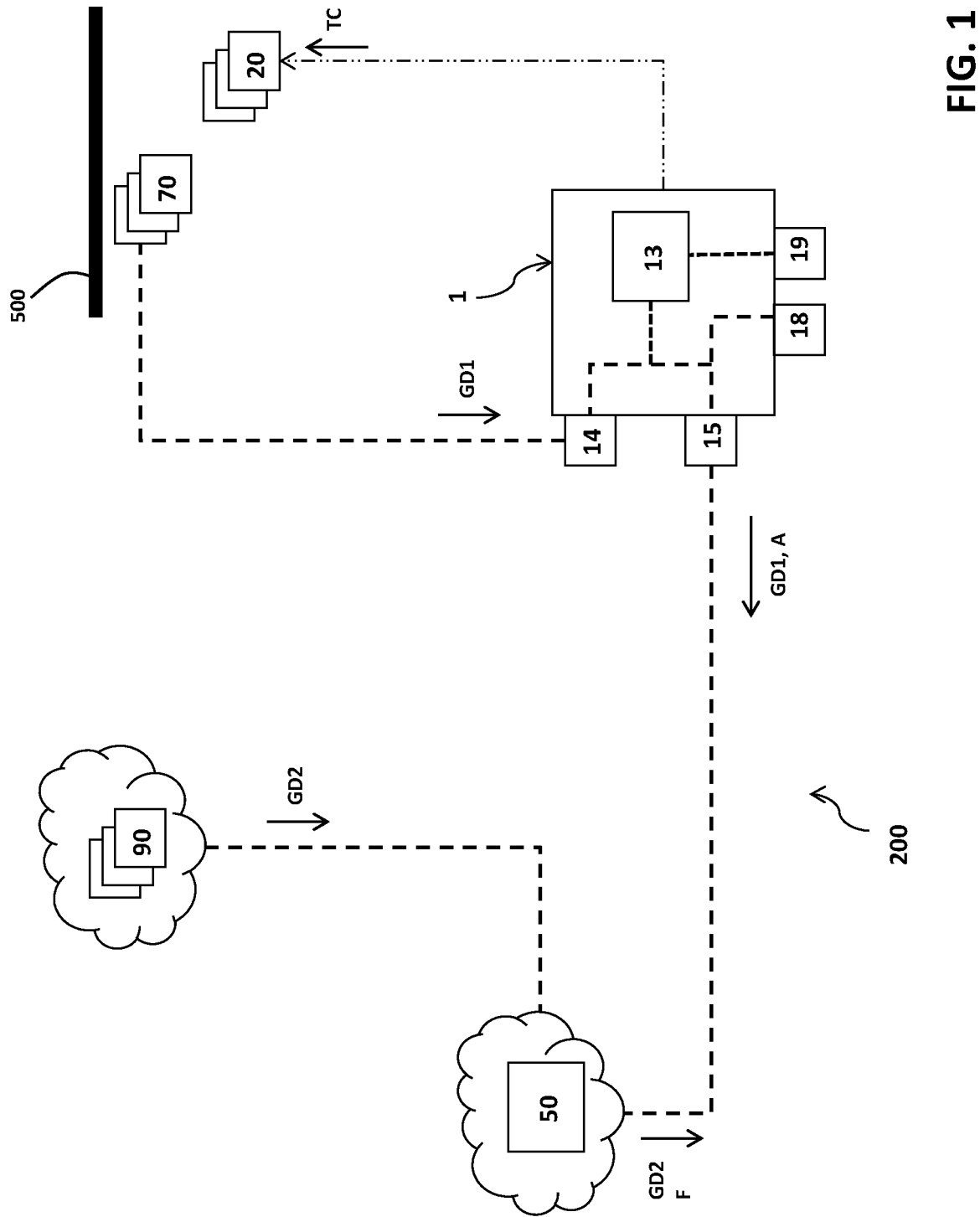
FIGS. 1-3 are schematic views showing the electronic protection device, according to the invention.
Figure 2:
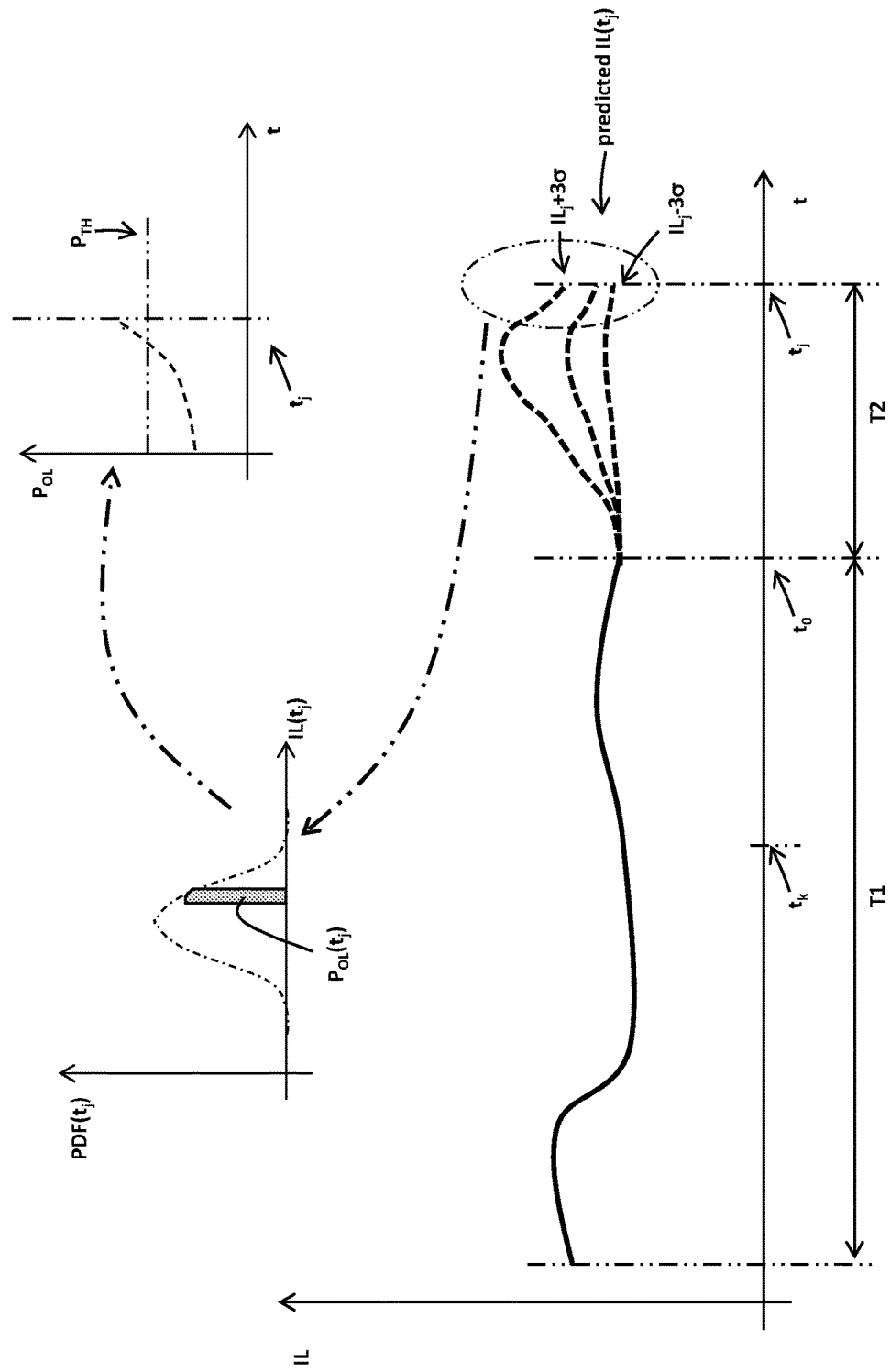
Figure 3:
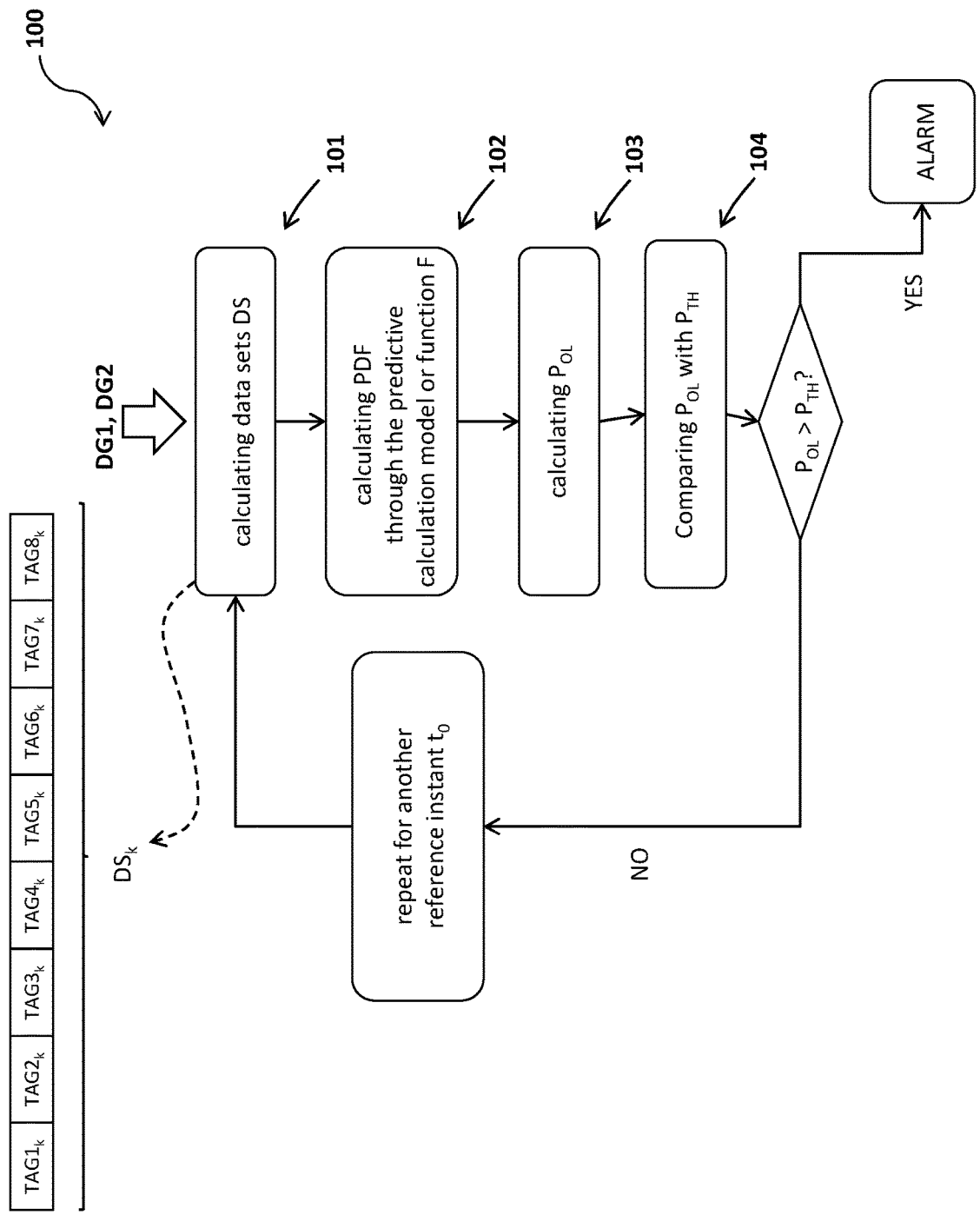

An example of implementation of the predictive monitoring procedure 100 is now briefly described (FIGS. 2-3).

It is desirable to calculate whether overload conditions may arise within a second time interval T2 (prediction time horizon) of 1 hour (3600 s) following the reference instant to (sampling period 1 s).

It is supposed that such a calculation can be based on grid monitoring data GD1, GD2 related to a first time interval T1 (historical time horizon) including the last 24 hours (86400 s) before the reference instant to (sampling period 1 s).

The calculation step 101 of the procedure 100 provides for calculating the data sets $D_k$ (k=$t_0$-1, . . . , k=$t_0$-86400) related to instants included on the first time interval T1.

Basing on the calculated data sets DS, it is possible to construct the regression vector x[t]=[$D_{t0-1}$, . . . , $D_{t0-86400}$].

The calculation step 102 of the procedure 100 provides for calculating the joint probability distribution function of the current in T2, i.e., PDF($t_{0+1, t+3600}$). As shown in FIG. 3, according to the calculated joint probability distribution function PDF, at the instant $t_j$, the line current IL($t_j$) is predicted to take values included in the interval [$IL_j$-3σ, $IL_j$+3σ].

The joint probability distribution function PDF at the desired prediction time horizon will be given by the following relation: PDF($t_j$)=F(x[t]), wherein x[t] is the above-mentioned regression vector and F( ) is the predictive calculation model or function set-up by the computerised platform 50 and transmitted by this latter to the electronic protection device 1.

The calculation step 103 of the procedure 100 provides for calculating the probability value $P_{OL}(t_j)$ indicative of the probability that the line current IL exceeds a reference threshold value $IL_{TH}$ in the interval T2.

The calculation step 103 of the procedure 100 provides for comparing the probability value $P_{OL}(t_j)$ with a predefined probability value $P_{TH}$.

If $P_{OL}(t_j)$>$P_{TH}$ is verified (as shown in FIG. 3), an alarm signal A is generated and possibly transmitted to the computerised platform 50 or another electronic device.

If $P_{OL}(t_j)$<=$P_{TH}$ is verified (as shown in FIG. 3), no alarm signals are generated and the predictive monitoring procedure may be repeated for another reference instant.

It is evident from the above how the present invention relates also to a computerised system 200 for monitoring an electric power distribution grid, which includes at least the electronic protection device 1 configured as described above and the computerised platform 50 in communication with said electronic protection device.

The computerised system 200 is conveniently adapted to carry out a predictive monitoring activity of one or more line currents IL flowing along corresponding electric lines 500 of the electric power distribution grid.

Such a monitoring activity involves an inference stage, which is conveniently carried by the electronic protection device 1 by cyclically executing the above-mentioned predictive monitoring procedure 100.

Such a monitoring activity further involves a training stage, which is preferably carried out by the computerised platform 50, independently said inference stage and without involving the electronic protection device 1.

Such a training stage consists in setting-up the above-mentioned predictive calculation model or function F to be used by the electronic protection device 1 while executing the above-mentioned predictive monitoring procedure 100.

The computerised system 200 is thus capable of providing high-level prediction functionalities without an excessive computational burden for the electronic protection device.

The electronic protection device 1 and the computerised system 200, according to the invention, allows fully satisfying the above-mentioned needs emerging from the state of the art.

The electronic protection device 1 and the computerised system 200 allow monitoring a predictive way the behaviour of the electric power distribution grid, in particular for what concerning the occurrence of overload current events.

This allows taking in advance the most appropriate actions to avoid or reduce undesired outages of the electric power distribution grid, which in turn allows a remarkably easier management of this latter.

In addition, it is possible to derive diagnostic information on the possible causes of overload phenomena by observing how the probability value POL has evolved in time.

The electronic protection device 1 and the computerised system 200 can thus provide advanced monitoring services of the operation of the electric power distribution grid by fully exploiting information collectable at grid level (first grid monitoring data GD1) and, possibly, at remote level (second grid monitoring data GD2).

The electronic protection device 1 and the computerised system 200 are of relatively easy and cheap realization at industrial level and are particularly suitable for being adopted in retrofitting interventions directed to improve monitoring activities of existing electric power distribution grids.

The invention claimed is:

1. An electronic protection device for electric power distribution grids, said electronic protection device being adapted to control one or more switching devices in an electric power distribution grid and being capable of communicating, at local level, with one or more sensors or electronic devices of said electric power distribution grid and, at remote level, with a remote computerised platform, said electronic protection device being adapted to receive first grid monitoring data indicative of physical quantities related to the operation of said electric power distribution grid from said sensors or electronic devices, said first grid monitoring data including at least measured values indicative of at least a line current flowing along at least an electric line of said electric power distribution grid, wherein it is adapted to carry out a predictive monitoring procedure of the operating conditions of said electric power distribution grid, said predictive monitoring procedure comprising:

based at least on said first grid monitoring data, calculating grid data sets indicative of the behaviour of said electric power distribution grid in a first time interval preceding a reference instant, each data set including at least a measured value indicative of said line current and monitored at a corresponding instant of said first time interval;

based on said joint probability distribution function, calculating a probability value indicative of the probability that said line current causes a trip intervention of said electronic protection device in said second time interval, according to a given reference tripping curve; and comparing said probability value with a predefined probability threshold value.

2. The electronic protection device, according to claim 1, wherein it is adapted to generate an alarm signal, if said probability value exceeds said predefined probability threshold value.

3. The electronic protection device, according to claim 2, wherein it is adapted to transmit said alarm signal to said remote computerised platform or to another electronic device in communication with said electronic protection device.

4. The electronic protection device, according to claim 3, wherein it is adapted to transmit said first grid monitoring data to said remote computerised platform.

5. The electronic protection device, according to claim 4, wherein it is adapted to receive second grid monitoring data indicative of environmental conditions at said electric power distribution grid from said remote computerised platform, said grid data sets being calculated basing on said first and second grid monitoring data.

6. The electronic protection device, according to claim 5, wherein it is adapted to receive said predictive calculation model from said remote computerised platform during an update firmware session of said electronic protection device.

7. The electronic protection device, according to claim 5, wherein it is adapted to set said predictive calculation model basing at least on said first grid monitoring data.

8. The electronic protection device, according to claim 2, wherein it is adapted to transmit said first grid monitoring data to said remote computerised platform.

9. The electronic protection device, according to claim 2, wherein it is adapted to receive second grid monitoring data indicative of environmental conditions at said electric power distribution grid from said remote computerised platform, said grid data sets being calculated basing on said first and second grid monitoring data.

10. The electronic protection device, according to claim 2, wherein it is adapted to receive said predictive calculation model from said remote computerised platform during an update firmware session of said electronic protection device.

11. The electronic protection device, according to claim 1, wherein it is adapted to set said predictive calculation model basing at least on said first grid monitoring data.

12. The electronic protection device, according to claim 1, wherein it is adapted to transmit said first grid monitoring data to said remote computerised platform.

13. The electronic protection device, according to claim 1, wherein it is adapted to receive second grid monitoring data indicative of environmental conditions at said electric power distribution grid from said remote computerised platform, said grid data sets being calculated basing on said first and second grid monitoring data.

14. The electronic protection device, according to claim 1, wherein it is adapted to receive said predictive calculation model from said remote computerised platform during an update firmware session of said electronic protection device.

15. A computerised system for monitoring an electric power distribution grid, comprising:
a remote computerised platform;
an electronic protection device in communication with said computerised platform, said electronic protection device adapted to control one or more switching devices in an electric power distribution grid and capable of communicating, at local level, with one or more sensors or electronic devices of said electric power distribution grid and, at remote level, with said remote computerised platform, said electronic protection device adapted to receive first grid monitoring data indicative of physical quantities related to the operation of said electric power distribution grid from said sensors or electronic devices, said first grid monitoring data including at least measured values indicative of at least a line current flowing along at least an electric line of said electric power distribution grid, wherein it is adapted to carry out a predictive monitoring of the operating conditions of said electric power distribution grid, said predictive monitoring procedure comprising:
based at least on said first grid monitoring data, calculating grid data sets indicative of the behaviour of said electric power distribution grid in a first time interval preceding a reference instant, each data set including at least a measured value indicative of said line current and monitored at a corresponding instant of said first time interval;
based on said joint probability distribution function, calculating a probability value indicative of the probability that said line current causes a trip intervention of said electronic protection device in said second time interval, according to a given reference tripping curve; and
comparing said probability value with a predefined probability threshold value.

16. The computerised system, according to claim 15, wherein said remote computerised platform is adapted to set and transmit said predictive calculation model to said at least an electronic protection device.

17. The computerised system, according to claim 16, wherein said remote computerised platform is adapted to set said predictive calculation model basing at least one said first grid monitoring data received from said electronic protection device.

18. The computerised system, according to claim 15, wherein said remote computerised platform is adapted to set said predictive calculation model basing also on profiling models describing the characteristics of said electric power distribution grid.

19. The computerised system, according to claim 15, wherein said remote computerised platform is adapted to transmit second grid monitoring data to said at least an electronic protection device.

20. The computerised system, according to claim 15, wherein said remote computerised platform is adapted to receive second grid monitoring data from external computerised platforms in communication with said remote computerised platform.

* * * * *